US009772758B2

(12) United States Patent
Lawson

(10) Patent No.: US 9,772,758 B2
(45) Date of Patent: *Sep. 26, 2017

(54) USER INTERFACE FOR DYNAMIC GENERATION OF TOURNAMENT BRACKETS

(71) Applicant: Sports Logic Group, LLC, Weston, FL (US)

(72) Inventor: Jeffrey Lowell Lawson, Davie, FL (US)

(73) Assignee: SPORTS LOGIC GROUP, LLC, Weston, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/939,882

(22) Filed: Nov. 12, 2015

(65) Prior Publication Data

US 2016/0070452 A1 Mar. 10, 2016

Related U.S. Application Data

(63) Continuation of application No. 14/269,555, filed on May 5, 2014, now Pat. No. 9,233,310, which is a continuation of application No. 14/058,051, filed on Oct. 18, 2013, now Pat. No. 8,753,213.

(51) Int. Cl.
| A63F 9/24 | (2006.01) |
|---|---|
| G06F 3/0484 | (2013.01) |
| G07F 17/32 | (2006.01) |
| A63F 13/798 | (2014.01) |
| A63F 13/23 | (2014.01) |
| A63F 13/73 | (2014.01) |
| A63F 13/828 | (2014.01) |

(52) U.S. Cl.
CPC .......... *G06F 3/04845* (2013.01); *A63F 13/23* (2014.09); *A63F 13/73* (2014.09); *A63F 13/798* (2014.09); *A63F 13/828* (2014.09); *G07F 17/3276* (2013.01)

(58) Field of Classification Search
USPC ..................................................... 463/31–42
See application file for complete search history.

(56) References Cited

U.S. PATENT DOCUMENTS

| 8,315,722 | B1 | 11/2012 | Russo |
|---|---|---|---|
| 2002/0065882 | A1 | 5/2002 | Arkin et al. |
| 2005/0132305 | A1 | 6/2005 | Guichard et al. |
| 2011/0244932 | A1 | 10/2011 | Bowe |
| 2013/0005419 | A1 | 1/2013 | Sediq |

*Primary Examiner* — Masud Ahmed
(74) *Attorney, Agent, or Firm* — Knobbe Martens Olson & Bear LLP

(57) ABSTRACT

The present disclosure describes an administration system which facilitates efficient setup, organization, and maintenance of tournaments, including league games. In particular, the administration system provides a user-friendly, intuitive and efficient-to-use interface for organizing tournaments and tournament brackets. The user interfaces and methods described provide tournament organizers and administrators with the ability to quickly and dynamically build custom tournament brackets of virtually any desired depth and configuration. The administration system, and in particular the tournament bracket management user interfaces, enable tournament administrators to focus on the task of building a custom tournament bracket structure quickly, while also automatically handling the minute logistics underlying the tournament such as when and where games are to be played.

20 Claims, 10 Drawing Sheets

*Round 1*

| | |
|---|---|
| 801 → | Tournament Game      ID # 001 |
| 802 → | Placement [Team]: Winner of Game 002 |
| 803 → | Field/Venue: [ Field Alpha ✕ ] |
| 804 → | Date/Time: Oct. 1, 2013 📅   4:00pm 🕐 |
| 805 → | Placement [Team]: Winner of Game 003 |

FIG. 8

USER INTERFACE FOR DYNAMIC GENERATION OF TOURNAMENT BRACKETS

CROSS-REFERENCE TO RELATED APPLICATIONS

This application is a continuation of U.S. application Ser. No. 14/269,555, filed May 5, 2014, which is a continuation of U.S. application Ser. No. 14/058,051 filed Oct. 18, 2013 (now U.S. Pat. No. 8,753,213). The disclosures of the aforesaid applications are hereby incorporated by reference.

BACKGROUND

Tournament organization and administration can often be a time-consuming and manual task, involving considerable management and overhead. The logistics of managing who (from individual players, teams, and divisions to other groupings), what, where, when, and how can be exponentially complex as the number of these variables increases. One area that can be particularly cumbersome for league and tournament organizers and administrators is in managing schedules. The typical administrator faces considerable challenges to managing games quickly and efficiently, from setting up regular season games in a manner that fairly balances age levels, skill sets, and other factors for hundreds of players and teams, to organizing balanced tournaments.

SUMMARY

The present disclosure describes a bracket administration system which facilitates efficient setup, organization, and maintenance of league games and tournaments. The bracket administration system provides a user-friendly, intuitive and efficient-to-use interface for organizing brackets for regular season or league play, and for tournaments which may be stand-alone or be based in part on regular season or league play standings. The user interfaces and methods described provide organizers and administrators with the ability to quickly and dynamically build custom tournament brackets of virtually any desired depth and configuration. The bracket administration system, and in particular the bracket management user interfaces, enable league and tournament administrators to focus on the task of building a custom tournament bracket structure quickly, while also automatically handling the minute logistics underlying the tournament such as when and where games are to be played. In some cases the bracket administration system may automatically determine which teams (or individuals, depending upon the sport) will play in a given game or match of a tournament based on the team or individual's placement or standing at the end of a season (or at the point in time just before the tournament is scheduled to begin).

The bracket management user interface gives administrators the option to configure specific teams (e.g., Team A plays Team B in the first round of a tournament, and the winner plays Team C in the second round) or placements (e.g., the #1 team in a grouping, such as a Division or Flight, based on standings before the tournament begins, plays the #2 team in the grouping; the actual teams playing may be unknown or "to be determined" when the tournament begins). Traditional approaches to bracket management often include manual data entry in a spreadsheet or table, a process that is time-consuming and more difficult to adjust or update. One benefit of the bracket management user interface described herein is that once a bracket hierarchy has been constructed by an administrator, the administration system can automatically populate, generate or update a tournament schedule with minimal or no further input by the user.

Neither this summary nor the following detailed description purports to define the scope of protection. The scope of protection is defined by the claims.

BRIEF DESCRIPTION OF THE DRAWINGS

FIG. 8 illustrates a detail view of a user interface element for a game in a tournament which may be displayed as part of a tournament bracket management user interface using the sport league administration system of FIG. 1.

DETAILED DESCRIPTION OF ILLUSTRATIVE EMBODIMENTS

Overview

Figure 1:
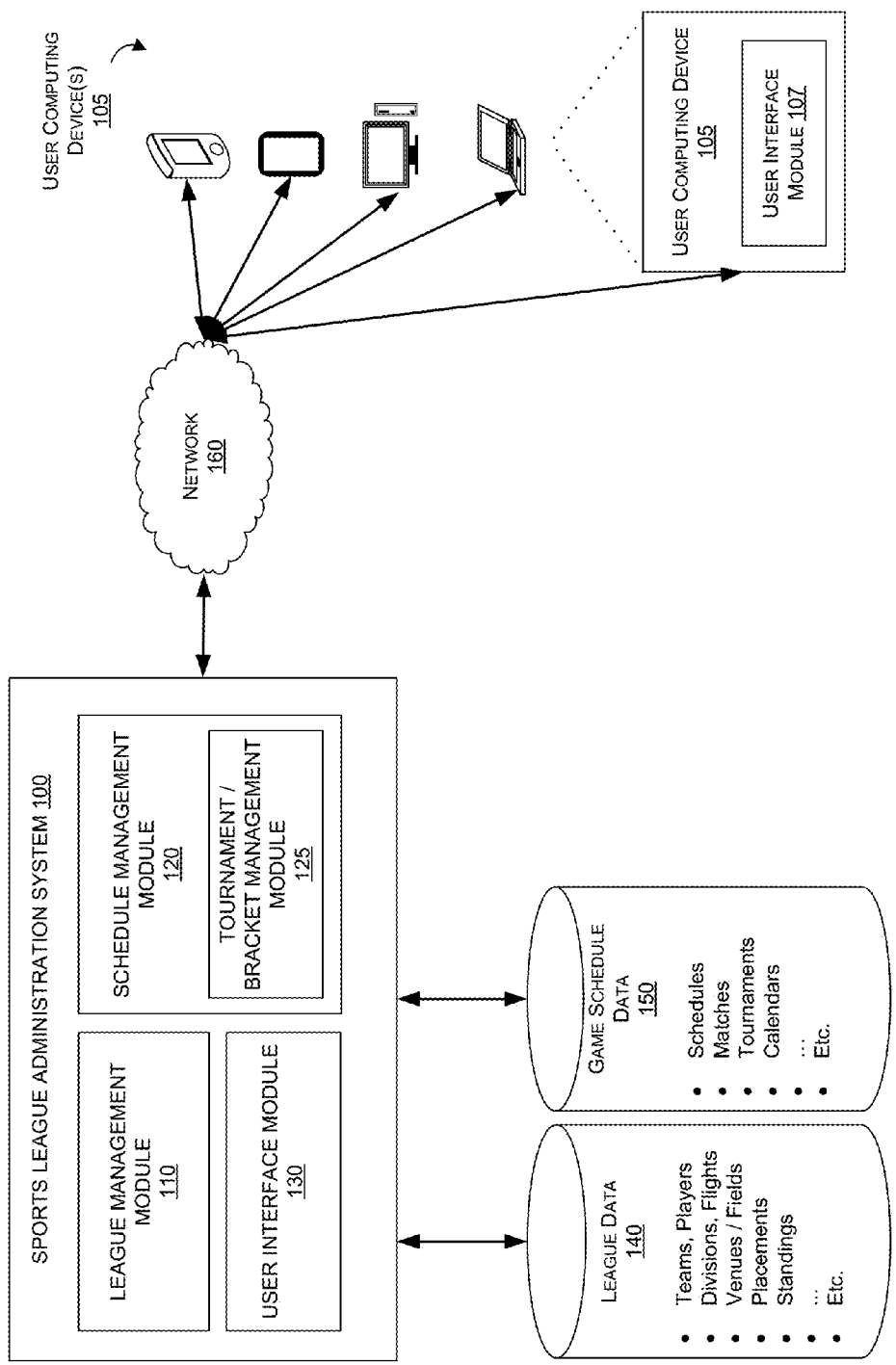
FIG. 1 is a block diagram depicting an illustrative network environment in which a sport league administration system may operate.

The bracket management features described herein may be part of a stand-alone tournament management application, or integrated as part of a larger league administration system. For ease of explanation, the bracket management features and user interfaces are illustrated and described herein in the context of a league administration system that includes other league administration features. As will be recognized, the disclosed features are also applicable to bracket creation and management for non-league tournaments and brackets. Further, the disclosed features are also applicable to tournaments and competitions involving non-sports activities such as chess, spelling competitions, etc.

The term "tournament," as used herein, is intended to encompass both league-based and non-league-based competitive events. For example, a tournament may consist of (1) regular season games played within a league, (2) league playoff games, or (3) a competitive event that is not part of a league.

In one embodiment a tournament bracket management user interface ("UI") provides a user, such as a league organizer or administrator, with a menu of placements or standings based on or generated from games played during a regular season. During the regular season, players may be placed on teams according to a variety of criteria (e.g., age, skill level, sex, physical attributes, and so on); teams may be placed in groups such as Divisions, also according to the same or other criteria; and within Divisions, teams may further be placed into sub-groups such as Flights, also according to the same or other criteria. Flight organization may be beneficial to encourage participation and balance competition, particularly for large Divisions in which skill levels vary widely within the same age group. Thus, during the regular season, as teams play games within their Division and/or Flights, they may accumulate placement standings. These placement standings may then be accessed by or provided to the tournament bracket management system or module, although the actual placement standings may not be displayed in the bracket manager user interface.

The tournament bracket management user interface provided by the league administration system described herein enables the user to, for example, begin by selecting a league division for which a tournament is to be created, edited, or managed. The system enables the user to add as many tournament brackets to the tournament as desired. For each tournament bracket, the tournament bracket management user interface provides controls for the user to quickly and easily add games to a bracket hierarchy (e.g., a tree diagram), for example by selecting a plus icon user interface element, symbol or other similar indicator associated with games in the bracket. In response to selection of the "plus" user interface element coupled to a selected game, the tournament bracket management user interface automatically adds a new game in a tournament round preceding the tournament round of the selected game. The winner of the newly added game would then be placed in the selected game to proceed through the tournament. The user can continue to branch games in this way to build out the tournament bracket to as many levels, or rounds, as desired.

Similarly, for each tournament bracket, the tournament bracket management system and user interface provides controls for the user to quickly and easily remove games from a bracket hierarchy (e.g., a tree diagram), for example by selecting a cross or "X" icon user interface element, symbol or other similar indicator associated with games in the bracket. In response to selection of the "X" user interface element coupled to a selected game, the tournament bracket management user interface automatically removes the branch game (or an entire branch of games if there are multiple levels games preceding the branch game) of the bracket hierarchy preceding or leading into the selected game. The winner of the newly added game would then be placed in the selected game to proceed through the tournament. The user can continue to branch games in this way to build out the tournament bracket to as many levels, or rounds, as desired.

The tournament bracket management system and user interface may also include a bracket/division management menu for the user to further customize the tournament bracket(s). This menu may include, for example, the ability to select a division for tournament editing, the ability to add additional brackets to a tournament, and the ability to select teams and/or placements for games in the tournament bracket(s). For example, in one embodiment, the user may configure the teams to play in a selected game by a drag-and-drop user interaction of "dragging" a team or placement from the menu and "dropping" the selected team or placement onto the selected game. The user can continue to add teams to games in this way to configure the tournament bracket until teams or placements have been assigned to each of the entry point games (e.g., games which have at least one competing team that is not a winning team from another game in the bracket).

The tournament bracket management system and user interface may provide other features and functionality, including, for example, functionality for moving games from one round to another round (e.g., to create or eliminate a bye game or round), and zoom controls to enable zooming in or out of the tournament bracket view (a feature of particular benefit if the tournament bracket has multiple levels and/or a large number of games).

Once the league organizer has built and configured the tournament brackets, the sport league administration system can then automatically generate a tournament schedule for each bracket. The schedule generation process may include automatically determining a field or venue for the game, and dates and times, and may be based in part on other league data available to the sport league administration system. In some embodiments, the field and date/time attributes may also be manually configurable by the user via the tournament bracket management user interface.

The features and user interfaces described herein may be applicable to any type of competitive sport which may be organized into a league, conference, tournament, or similar organization. For simplicity, the examples of games described herein may only include two teams. However, in some embodiments there may be games which involve more than two teams (e.g., a game of paintball may involve three or more teams, with one or more "winning" teams eligible to advance to the next round). In these cases there may be additional placement teams added to each game in a tournament bracket. For each additional team, the user would have an additional option to create a branch leading into that game to determine the winner(s) from previous rounds to play in the game of more than two teams. It may also be possible that in some embodiments and/or depending on the sport, instead of teams the games may only involve a single player (e.g., tennis, wrestling, chess, single player card games such as poker, etc.). All of the examples shown and described herein are applicable to such "single player" sports or scenarios, as well as sports in which games may involve more than two teams competing for one or more winning placements to advance to the next round. As used herein the terms league administration system and sport league administration system may be used interchangeably.

Example System Architecture

FIG. 1 is a general architecture diagram schematically illustrating an example of a sport league administration ("SLA") system 100 that performs and provides the tournament bracket generation services described herein. The SLA system 100 can include any system capable of performing the processes described herein. For example, in the illustrated embodiment of FIG. 1, the SLA system 100 communicates with one or more user computing devices 105 over a network 160. In FIG. 1, the SLA system 100 includes several components such as a league management module 110, user interface module 130 and a schedule management module 120. The schedule management module 120 may also include, for example, a tournament/bracket management module 125. These components may also include further components that may not be depicted in FIG. 1. For example, SLA system 100 can also include one or more servers, e.g., a web server, configured to receive and respond to requests from the user computing devices 105.

The league management module 110 may be configured to, for example, manage various aspects of a sports league including, but not limited to, registration of participants or players, managing seasons, teams, divisions, flights, uniforms, accounts/finances, and other such administrative matters related to running a sports league. The schedule management module 120 may be configured to execute various processes and methods for managing different schedules for a league including viewing or editing a games calendar, scheduling games, organizing flights or divisions, setting up tournament brackets and managing fields, among other things. In particular, the tournament bracket management module 125 may be configured to execute various processes, such as the process 900 described with reference to FIG. 9) and the process 1000 described with reference to FIG. 10.

Also shown in FIG. 1, the SLA system 100 may include and/or have access to one or more data stores or data sources including, for example, a league data store 140 and a game/scheduling data store 150. The league data store 140 may include data for the league administration system, such as information or data about leagues, conferences, teams and players/athletes, coaches, divisions, flights, venues or fields, placements, standings, win/loss records, various statistics about the teams and games, season standings, historical tournament results, and so forth. The game schedule data 150 may include data related to schedules, calendars, matchups or games, tournaments and other similar data related to the actual scheduling of games.

Also shown in FIG. 1, a sample user computing device 105 may include a user interface module 107 which may be configured to execute some or all of the processes described herein. This may, for example, enable the user computing device 105 to provide the tournament bracket creation features to the user of the device, even when the device may be not connected to the SLA system 100 over the network 160. This may be the case, for example, if the user computing device 105 does not have wireless access, may not be connected to a cellular network, and so forth. In some embodiments, the SLA system 100 may be a web-based system that may be accessed by users using an ordinary web browser. The SLA system 100 may be accessible by a league organizer or administrator to perform the bracket management functions described herein. In other embodiments, the SLA system 100 may also be accessible by a non-administrative users (e.g., players, coaches, etc.) who may have permission to view tournaments, brackets, game results, and so on, but may not have access to the bracket management functions provided by the league administration system.

The user interface module 107 may be configured to, for example, generate one or more user interfaces, such as the user interfaces described herein (e.g., FIGS. 2, 3A, 3B, 4A, 4B, 5A, 5B, 6A, 6B, 7, and 8), to provide the tournament bracket features to the user of the device. In one embodiment, some or all of the user interfaces and/or UI elements may be generated either by the SLA system 100 and provided to the user computing device 105, or they may be generated on the user computing device 105 via the user interface module 107, or in some combination thereof.

Example User Interfaces for Generating Tournament Brackets

FIGS. 2, 3A, 3B, 4A, 4B, 5A, 5B, 6A, 6B, 7, and 8 illustrate example user interfaces related to dynamic generation of tournament brackets, as used in one or more embodiments of the SLA system 100. The sample user interfaces may be displayed, for example, via a web browser (e.g., as a web page), a mobile application, or a standalone application. However, in some embodiments, the sample user interfaces shown in FIGS. 2, 3A, 3B, 4A, 4B, 5A, 5B, 6A, 6B, 7, and 8 may also be displayed on any suitable computer device, such as a cell/smart phone, tablet, portable/mobile computing device, desktop, laptop, or personal computer, and are not limited to the samples as described herein. The user interfaces include examples of only certain features that a SLA system 100 may provide. In other embodiments, additional features may be provided, and they may be provided using various different user interfaces and software code. Depending on the embodiment, the user interfaces and functionality described with reference to FIGS. 2, 3A, 3B, 4A, 4B, 5A, 5B, 6A, 6B, 7, and 8 may be provided by software executing on the individual's computing device (e.g., via user interface module 107), by a SLA system 100 located remotely that is in communication with the computing device via one or more networks, and/or some combination of software executing on the computing device and the SLA system 100. In other embodiments, analogous interfaces may be presented using audio or other forms of communication. In an embodiment, the interfaces shown in FIGS. 2, 3A, 3B, 4A, 4B, 5A, 5B, 6A, 6B, 7, and 8 are configured to be interactive and respond to various user interactions. Such user interactions may include clicks with a mouse, typing with a keyboard, touches and/or gestures on a touch screen, voice commands, and/or the like.

Figure 2:
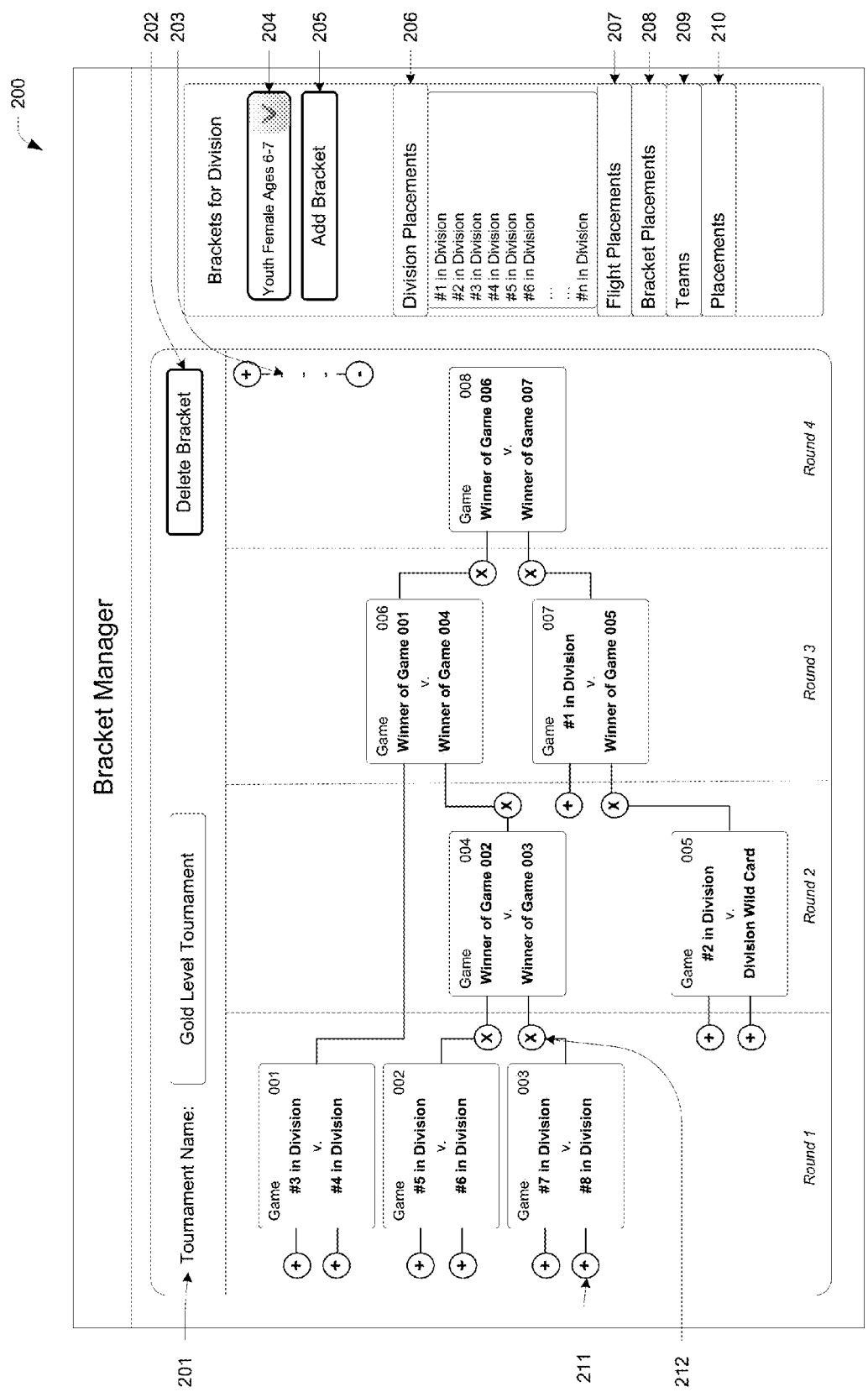
FIG. 2 illustrates an example user interface for dynamically generating a tournament bracket using the sport league administration system of FIG. 1.

FIG. 2 illustrates an example user interface 200 for dynamically generating tournament brackets in one embodiment of the SLA system 100 of FIG. 1. As shown in FIG. 2, the bracket manager interface presents the user with a view of one or more tournaments and various games that are organized within the tournament. The user may be able to edit the tournament name for example, via the UI element 201. In this example, the tournament is named "Gold Level Tournament." Via selection of UI element 202, the user can also delete the current bracket.

The user interface shown in FIG. 2 includes a menu on the right for managing brackets for a particular league division (e.g., youth female, ages 6-7, as shown as selected at UI element 204). At UI element 205, the user may have the option to add an additional bracket to the tournament. The user interface for the bracket manager can support as many brackets as the user would like to add. An example of multiple brackets shown in the bracket manager is illustrated with reference to FIG. 7. Also shown in the bracket manager menu on the right, UI element 206 presents the user with a list of division placements, UI element 207 presents a list of flight placements, UI element 208 presents a list of bracket placements for the tournament bracket(s), UI element 209 presents a list of teams, and UI element 210 presents a list of placements.

As shown in FIG. 2, the division placements UI element 206 is expanded to display a list of division placements which are eligible for inclusion in this tournament. As will be further described herein, the user can select a division placement for inclusion in the tournament by, for example, clicking on/selecting, dragging and dropping one of the division placements from the list onto a game in the tournament bracket. Thus, for example, as shown in FIG. 2, the user has selected "#3 in division" and "#4 in division" for Game 001 in Round 1. In other embodiments, the user may also be able to add flight placements, bracket placements or specific teams. Division placements may correspond to the rankings for this particular division at the end of a season or at the time the tournament is scheduled to begin. Similarly, the league administrator may have organized various flights as another way of grouping the teams for play during a regular season. Thus, the user may want to configure the tournament based on the placement within various flights as opposed to placement within certain divisions. This might be particularly beneficial where a flight is organized or grouped for players of similar skill level or age, which may not be reflected at the division level.

The bracket placements include, for example, a list of placements that are generated as the tournament bracket is built out. So, for example, the bracket placements list may include a Loser of Game 001, a Loser of Game 002, a Loser of Game 003, and so forth for each game currently in the tournament bracket. Then the user may use these bracket placements to further develop the tournament bracket, for example, by creating runner-up matches, games for third place or consolation games, and similar variations on having the loser of the game play the loser of another game to further develop the tournament bracket.

A list of teams in the selected division may also be presented so that the user may build the tournament bracket directly by matching certain teams against each other. This may be desirable in some circumstances where the division/placements and/or the flight placements may not be readily available, or in some instances in which the user may wish to override the default behavior of the SLA system 100. For example, if the user knows that the no. 1 division team has been disqualified for various reasons or is no longer eligible to play, then the user may wish to select an alternate team from the teams list to fill in that spot. Finally, the placements selection list may include points that may be associated with the winner of a given game or tournament bracket. These placement points may be tracked over time by the SLA system 100, such that during the course of league play, a tournament, or multiple tournaments, the teams/players carry their placement points with them.

Also shown in FIG. 2, the user can build the tournament bracket dynamically and quickly by using the various expansion buttons such as the one shown at UI element 211. These indicators may be displayed, for example, to the left of a game and enable the user to create a new branch off of the preceding game or the base game. As shown in FIG. 2, the user can select any of the plus indicators as appended to the end of Game 001, Game 002 or Game 003 in order to add an additional game that would lead into each of these games. Thus, for example, in response to the user clicking on UI element 211, the user interface would automatically update and refresh to add an additional game to the left of Game 003 and introduce an additional round into the tournament bracket. Thus, the new Game 009, for example, would then become the only game in Round 1 while the other games in Round 1 would become Round 2, the games in Round 2 would now be Round 3 and so forth. Thus, the user can quickly add games and develop as many rounds as desired for the current tournament bracket. Also shown in FIG. 2 is UI element 212 which shows an X indicator connecting Game 003 to Game 004 between Round 1 and Round 2. By selecting or clicking on or otherwise interacting with this UI element 212, the user can effectively remove Game 003 and any games that lead into Game 003 from the tournament bracket. Thus, for example, if the user were to select the X indicator similar to UI element 212 at the branch leading off of Game 008 in Round 4, then this would also remove, for example, Game 007 which leads into Game 008 and Game 005 which leads into Game 007. Thus, the user has the option or the ability to quickly remove entire sub-tournaments from the tournament bracket and manage the tournament bracket in this way.

As will be described further with reference to FIGS. 5A and 5B, the user may also be able to move games from one round to another round, such that the winner of a game might receive a bye from one round, skipping the next round, and going onto the subsequent directly. This is illustrated in FIG. 2, for example, as the winner of Game 001 skips Round 2 and goes straight to Round 3 to play in Game 006 against the winner from Game 004 in Round 2. The user may be able to move these games from one round to another by, for example, clicking and dragging on a game to move it from one portion of the user interface to another, or in some instances, by touching and dragging an element from one round to another round (e.g., when the user interface is displayed on a touch screen device).

Each game in the tournament bracket may have associated with it various attributes of the game, which inform the user about who is going to be playing when and where. Further details about what each game shown in the brackets may include is illustrated and described, for example, with reference to FIG. 8.

Also shown in FIG. 2 is UI element 203, which is a zoom level selector which may be provided to enable the user to zoom in or out of the tournament bracket to view more or less detail about the tournament. This zoom feature may, for example, zoom out to show more games in one view at a time so that the user can quickly scan the entire tournament and figure out where teams will be progressing through the tournament brackets or to quickly jump from one section of the tournament to another by zooming out and then zooming in on a different section of the tournament bracket. Although the example shown in FIG. 2 shows a zoom element with a plus and minus icon and a sliding scale between, other variations may also be used including a percentage number, a sliding scale bar and other similar type mechanisms which may be used to zoom in or out of the user interface.

Figure 3A:
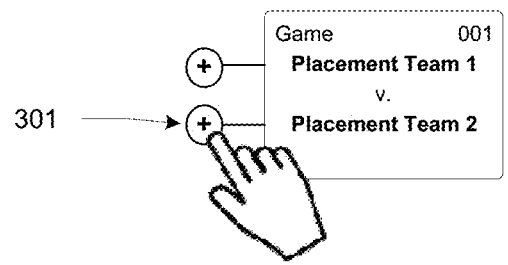
FIGS. 3A and 3B illustrate an example of using the tournament bracket management user interface to add a game or branch to a tournament bracket using the sport league administration system of FIG. 1.
Figure 3B:
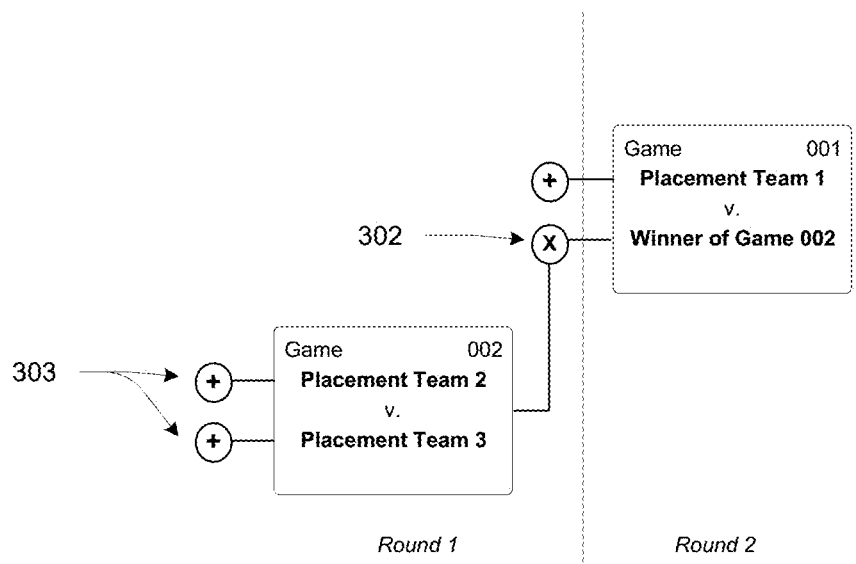

FIGS. 3A and 3B illustrate an example of using the tournament bracket management user interface to add a game or branch to a tournament bracket in the SLA system 100 of FIG. 1. For example, the user may dynamically build a bracket by selecting the plus icons adjacent to games in the tournament bracket. The hand cursor pointing at UI element 301 indicates that the user is selecting this UI element to add an additional game off of this game in Round 1. The result of this interaction is shown in FIG. 3B. In FIG. 3B, the user interface has been updated to add Game 002 to the left and adjacent to the Game 001 originally shown in FIG. 3A. The position of Game 002 in the user interface may be relative to Game 001 such that there is still room to branch off of Game 001 in another direction. Thus, for example, since Game 001 includes two different teams, the user may wish to branch off of Game 001 in two different directions, thus creating an additional round before the Game 001 round. As shown in FIG. 3B, once the user has selected the option to add an additional game, the user interface element changes from the plus symbol to an X symbol as shown at UI element 302. As discussed previously, this X symbol indicates that the user may click on the X to remove the added game and return the user interface to the view shown in FIG. 3A. Also shown in FIG. 3B, the new game that has been added, Game 002, automatically adds the plus indicators to the left as shown at UI element 303 to enable the user to add further games and additional rounds, preceding Game 002 in Round 1 and Game 001 in Round 2. Thus, the user can continue to branch out the games to as many levels as desired to fully develop or generate the tournament bracket.

Figure 4A:
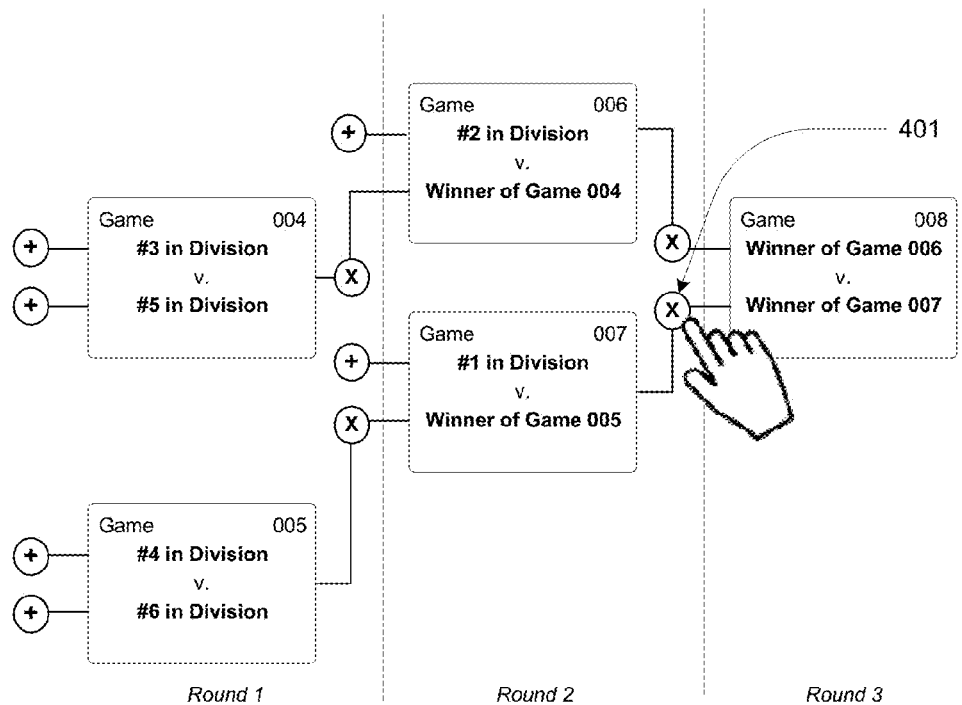
FIGS. 4A and 4B illustrate an example of using the tournament bracket management user interface to remove a game or branch from a tournament bracket using the sport league administration system of FIG. 1.
Figure 4B:
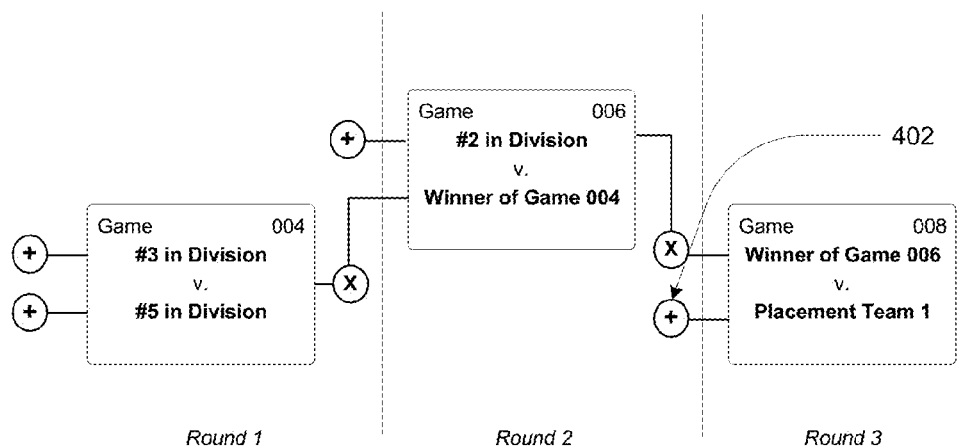

FIGS. 4A and 4B illustrate an example of using the tournament bracket management user interface to remove a game or branch from a tournament bracket. Thus, for example, in FIG. 4A, UI element 401 is presented as an X symbol because there are games leading into the Round 3 of Game 008 which may be removed by the user by selecting UI element 401. The result of selecting UI element 401 is shown in FIG. 4B. FIG. 4B illustrates that the entire branch of the tournament bracket which comprised Game 007 and Game 005 has now been removed in its entirety. In some embodiments, the user interface may present a confirmation dialog to the user to confirm the desire to remove an entire branch or a game before removing the game. This may prevent the user from inadvertently removing either a single game or a complicated branch of the tournament bracket accidentally. As shown in FIG. 4B, the UI element 401 has been replaced with UI element 402 which is the now familiar plus icon or symbol indicating that the user has the option to add an additional branch game off of Game 008 and build out a new branch if desired. Although not shown in FIGS. 4A and 4B, if a user removes a game or branch which includes one or more games in earlier rounds where there is only one game in the round, then removal of the branch or game will result in removal of the round as well. Thus, for example, if there were initially four rounds and the removal of the branch in FIG. 4A were to remove the only game from Round 1, then the resulting display in FIG. 4B would only show three rounds.

Figure 5A:
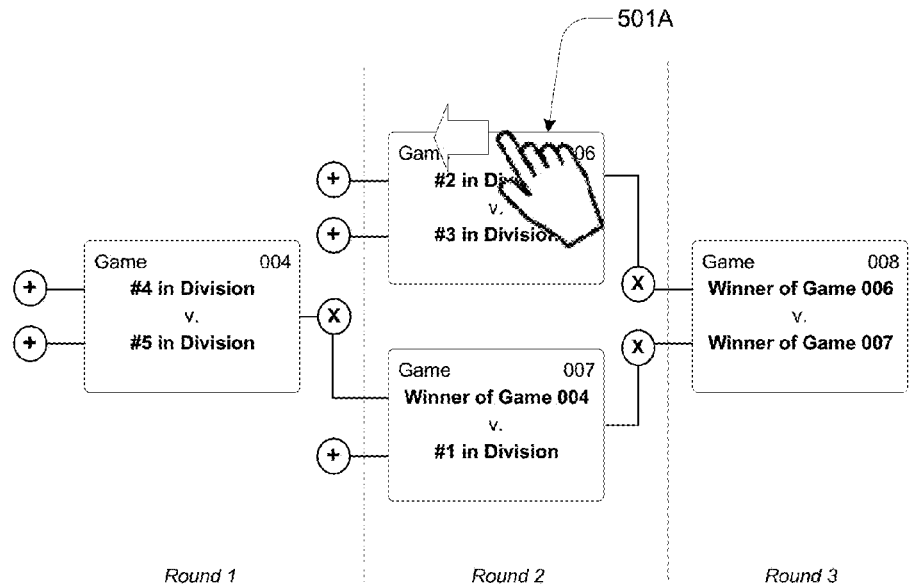
FIGS. 5A and 5B illustrate an example of using the tournament bracket management user interface to move a game or branch in a tournament bracket using the sport league administration system of FIG. 1.
Figure 5B:
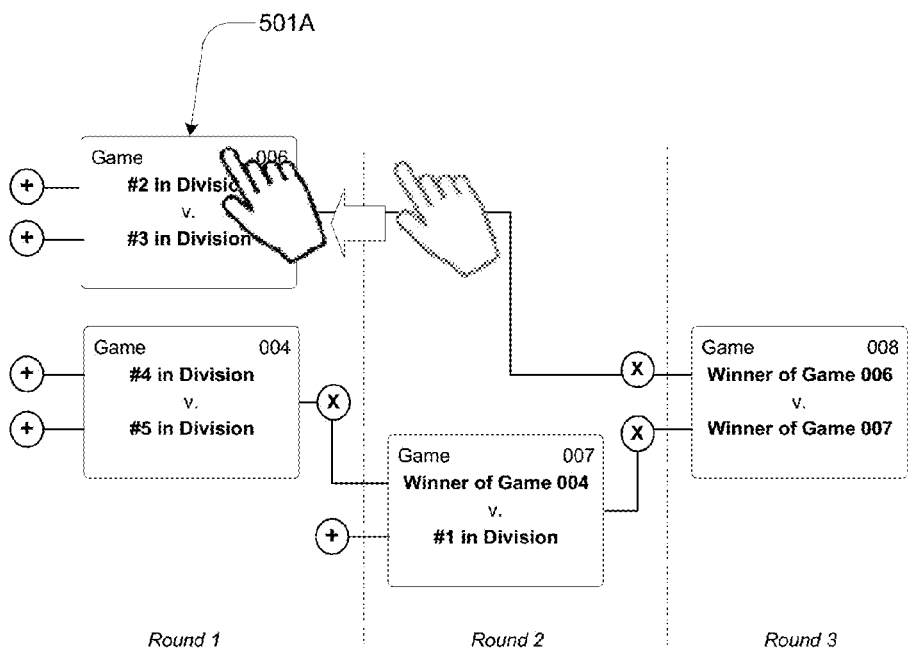

FIGS. 5A and 5B illustrate an example of using the tournament bracket management user interface to move a game or branch in a tournament bracket in the SLA system 100 of FIG. 1. Thus, as shown in FIG. 5A, the user element 501A corresponding to the Game 006 is being selected by the user to move from Round 2 to Round 1. This will have the practical effect of granting the winner of game 6 a bye from Round 1 straight to Round 3, to play the winner of Game 007 from Round 2. The result of this user interaction is shown in FIG. 5B, wherein the user has completed the action to move the game element 501A to Round 1, and the tournament bracket user interface has been updated to reflect this move.

Figure 6A:
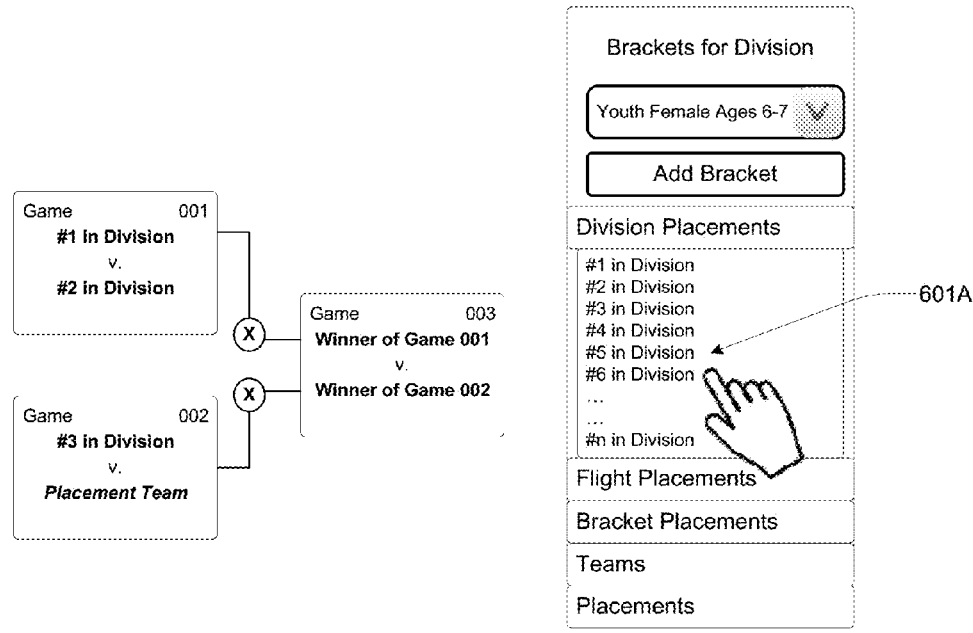
FIGS. 6A and 6B illustrate an example of using the tournament bracket management user interface to add a team or placement to a game in a tournament bracket using the sport league administration system of FIG. 1.
Figure 6B:
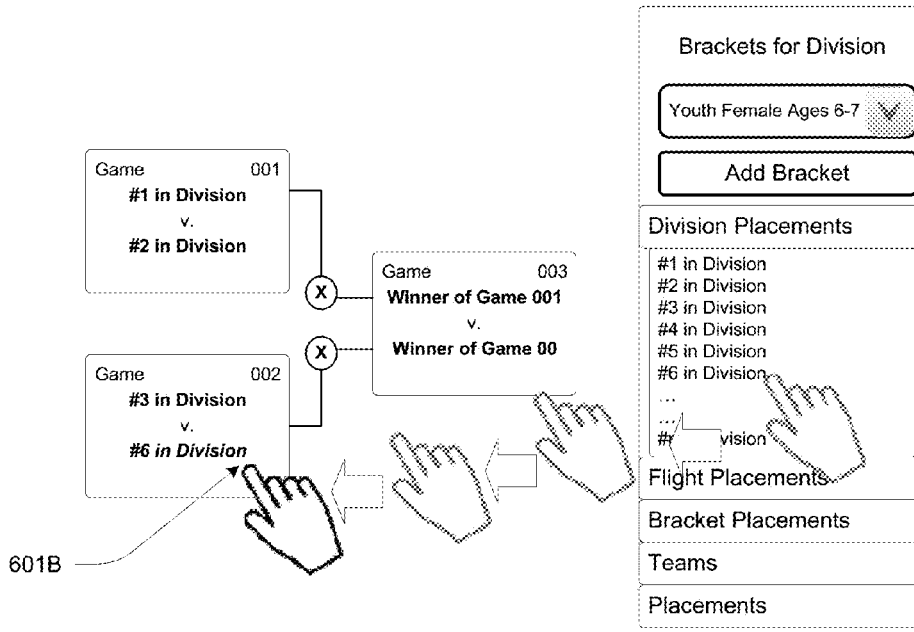

FIGS. 6A and 6B illustrate an example of using the tournament bracket management user interface to add a team or placement to a game in a tournament bracket. Thus, for example, starting with FIG. 6A the tournament bracket shown has already been configured to have the no. 1 team in the division play the no. 2 team in the division in Game 001, and the no. 3 team in the division is going to play in Game 002 against a team yet to be placed. Thus, the user may wish to add an additional division placement team to Game 002 to play against the no. 3 team. In this example, the user is in the process of selecting the no. 6 team in the division as shown at UI element 601A. FIG. 6B illustrates the result of the user interaction started in FIG. 6A. Thus, at UI element 601B, the diagram shows that the user has selected the no. 6 team in the division and moved the selection over to Game 002. The user interaction may be, for example, clicking on that element and dragging it into Game 002 and releasing to end the drag operation. The drag and drop may be performed, for example, by using a mouse on a computer or by a touch and drag interaction supported on a touch-screen device or a similar user interaction. Thus, by the examples shown in FIGS. 6A and 6B, the user can quickly select division placements for the tournament bracket and build the tournament quickly. In other embodiments, the user may be selecting from the other placement menus, such as the flight placements, the bracket placements, the list of teams or the placement standings overall as discussed herein.

Figure 7:
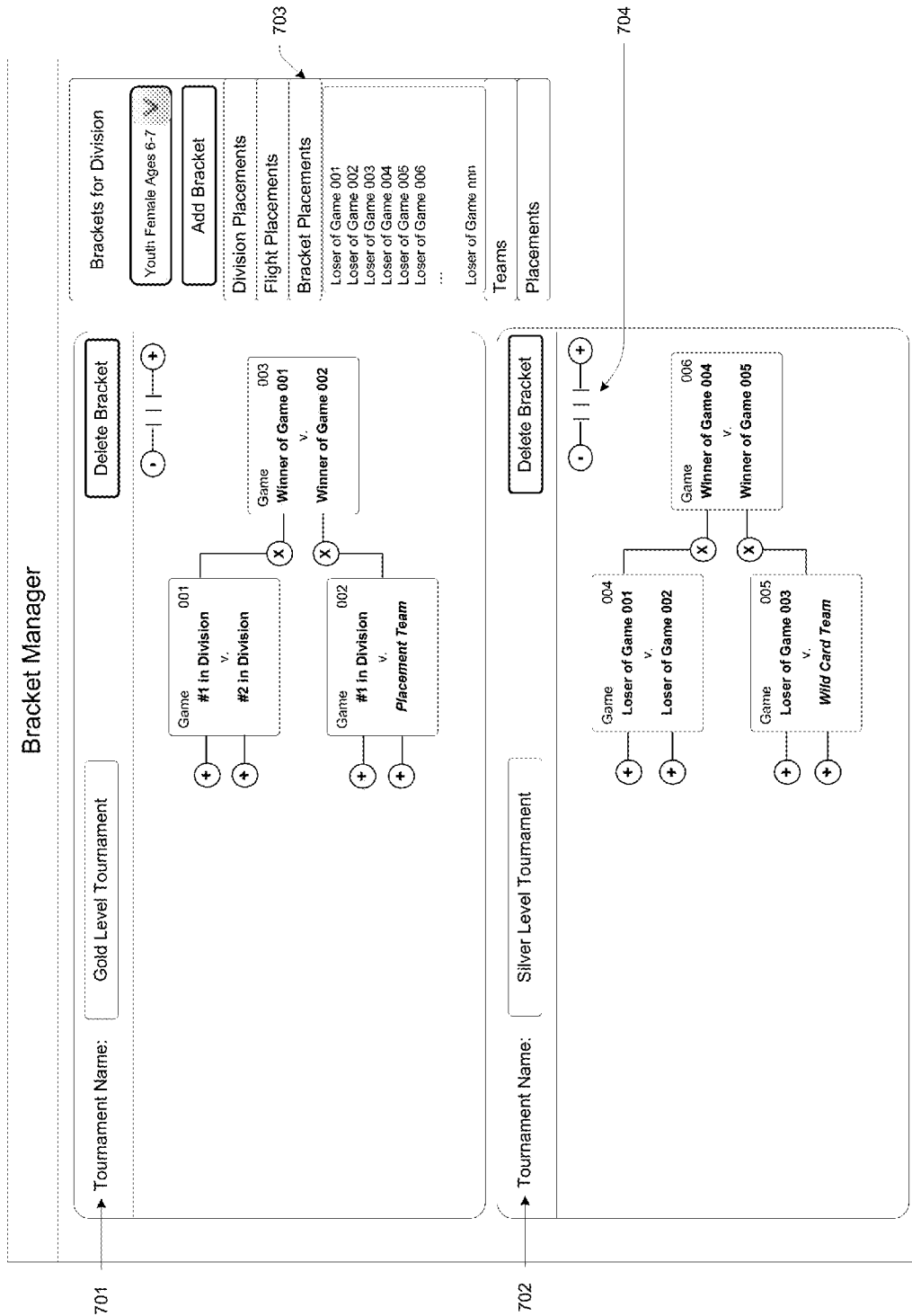
FIG. 7 illustrates an example user interface for dynamically generating two or more tournament brackets using the sport league administration system of FIG. 1.

FIG. 7 illustrates an example user interface for dynamically generating two or more tournament brackets. This figure shows multiple brackets being added for the division, youth female age 6 through 7. Thus, as shown in FIG. 7, there is a first tournament 701 which is the "Gold Level Tournament" and the second tournament bracket 702 which is named the "Silver Level Tournament." Also shown in FIG. 7 is UI element 704, which is a horizontal variation on the zoom level selector 203 illustrated and described with reference to FIG. 2. Also, as shown in the "Brackets for Division" menu on the right, the bracket placements list has been selected for expansion instead of the division placements list. For each of the games presented in the two tournament brackets, the loser of each game is added to the list of potential bracket placements that may be used to further generate or build the tournament bracket.

In the example shown in FIG. 7, a silver level tournament has been constructed to have the losers of various games in the gold level tournament play each other, presumably to play for a silver medal or a silver level ranking or placement score or similar consolation prize. Thus, for example, Game 004 has been set up to have the loser of Game 001 from the gold level tournament bracket play the loser from Game 002, also from the gold level tournament bracket. In another embodiment not shown in FIG. 7, the user may also have the option to add a consolation game to a tournament bracket which may enable the user to add another stand-alone game to a round and then have bracket placements placed into that consolation game. Thus, for example, instead of having a silver level tournament bracket, as shown in FIG. 7, the user may simply have a gold level tournament bracket and have the option to add a consolation game, which may be, for example, a silver medal game where the losers of Game 001 and Game 002 may play each other for the bronze medal.

FIG. 8 illustrates a detail view of a user interface element for a game in a tournament which may be displayed as part of a tournament bracket management user interface, involving a sport league administration system, such as the sport league administration system of FIG. 1. The game UI element displays several attributes associated with the game. Thus, for example, UI element 801 indicates the name of the tournament and/or game, as well as an identifier for the tournament game which may be used for the bracket placements as described herein. A UI element 802 provides an indicator of the first team that is going to play in this game. This may be a placement which may be an undetermined team at the present time, or it may be a particular team that the user has selected for this game. In some embodiments, the tournament game in a tournament bracket will consist of two placement teams which will be determined as the result of prior games played in preceding rounds (e.g., teams playing in a final round may be determined by the winners of games played in a semi-final round). But in some instances, the first round games may consist of placement teams which will not be known until the time that the tournament is going to begin, since these placements might be, for example, based on division standings, flight standings or other placement standings which will be undetermined until the end of a season. In one embodiment, the SLA system 100 may later populate these generic team placement identifiers with the specific team names as game scores and/or results are entered into the system and winning teams are determined.

Also shown in FIG. 8 at UI element 803, the game may include, for example, information about the field or a particular venue that the game is to be played. This may be shown by, for example, a drop-down list or menu which might be user-selectable to change the field or it may be a read-only value which the user cannot change. This may be useful in the context of an automated scheduling system which automatically assigns fields to the games based on availability and based on timing. Thus, in some embodiments, the user may be able to override the field selection or they may not.

FIG. 8 also includes UI element 804 which may illustrate to the user the date and time that the tournament game is to be played. This may also be either a read-only field or a user selectable and editable field depending on the embodiment. However, it should be clear that in most instances a tournament game in a later round should be played, or will be played, at a date and time later than a game in a prior round. Thus, for example, if the winner of tournament Game 004 is to play in Game 005, then it would make sense that Game 005 will have a date and time later than the date and time of Game 004. However, in some instances games in earlier rounds may overlap with games in later rounds. Such might be the case if, for example, the game is a bye game.

Finally, in FIG. 8, UI element 805 indicates the other placement team which is to be playing against the first placement team as indicated at UI element 802.

Examples of Methods for Generating Tournament Brackets

Figure 9:
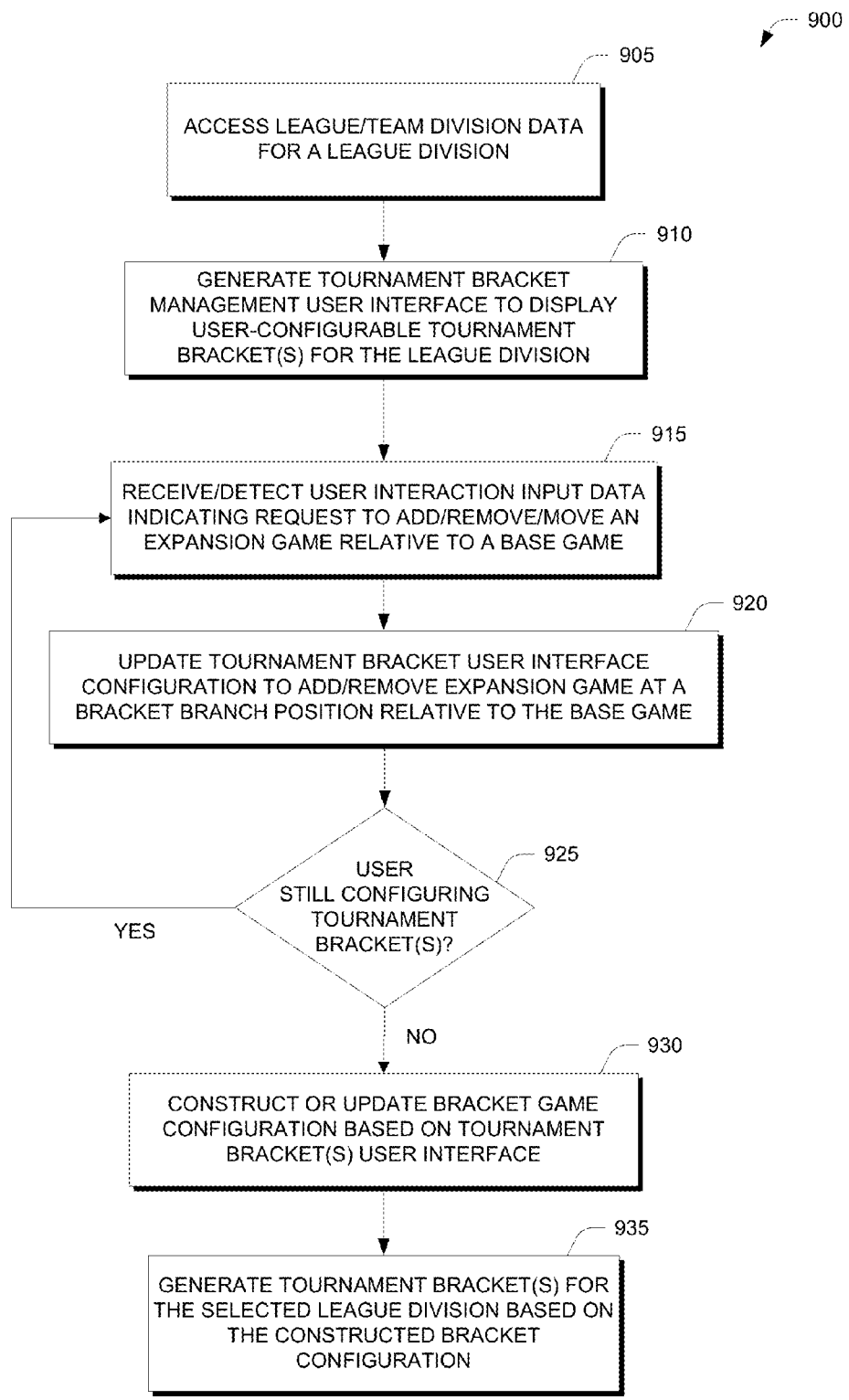
FIG. 9 is a logical flow diagram of an embodiment of a process for building one or more tournament brackets and generating a tournament schedule using the sport league administration system of FIG. 1.

FIG. 9 schematically illustrates a logical flow diagram of an embodiment of a process 900 for building one or more tournament brackets and generating a tournament schedule in the SLA system 100 of FIG. 1. The process 900 may be executed, for example, by the league management module 110, the user interface module 130, the schedule management module 120, and/or the tournament/bracket management module 125 of the SLA system 100 of FIG. 1. In one embodiment, the process 900 may also be executed in whole or in part by the user interface module 107 on a user computing device 105, in communication with the SLA system 100. In various embodiments, fewer blocks or additional blocks may be included in the process, or various blocks may be performed in an order different from that shown in FIG. 9. For ease of illustration, the process 900 will be described as being executed by the SLA system 100.

Beginning at block 905, the SLA system 100 may access league and/or team division data and game schedule data for a league division. For example, the league/team division data may be accessed from league data source 140 and the game schedule data may be accessed from the game schedule data store 150. The data may be used as part of the tournament bracket generation process, for example, by presenting a list of teams and/or a list of leagues in the user interface for selection to create a tournament bracket. Similarly, the game schedule data may be used to determine, in part, tournament bracket scheduling such as dates and times of the tournament bracket games as well as the fields and/or venues that will be used for the various games in a tournament bracket.

At block 910, the SLA system 100 generates a tournament bracket management user interface to display user configurable tournament brackets for the league division. An example of this user interface is shown, for example, in FIG. 2. The user interface may present various options for the user to configure the tournament bracket including, but not limited to, adding one or more brackets to a tournament, adding one or more games to a tournament bracket including branching games off of base games in the tournament bracket and so forth, as discussed herein.

At block 915, the SLA system 100 receives user interaction input data indicating a request to add, remove and/or move an expansion game relative to a base game. For example, a tournament bracket may begin with a single game indicating the final round and the user may wish to add additional rounds to the tournament bracket by adding one or more expansion games relative to the base game in the final round. The user may do this, for example, by selecting the plus symbol or icon adjacent to the base game or by other interactions that may be supported by the tournament bracket management user interface. For example, in some embodiments, the tournament bracket user interface may support touch inputs or voice inputs and other types of user interaction inputs to facilitate adding of brackets that may not necessitate clicking on an icon in the user interface.

At block 920, the tournament bracket interface is updated to add, remove or move the expansion game at a bracket branch position relative to the base game. Thus, for example, in response to the user selecting to add an expansion game in a semi-final round, for example, the user interface configuration will update to add the additional round game such as the example shown in FIGS. 3A and 3B. Also, in response to the user selecting the option to remove a game from the tournament bracket, the user interface will update to remove that bracket, such as the example shown in FIGS. 4A and 4B. In another example, in response to the user selecting the option to move a game from one round to another round, the user interface will update in response to the user interaction by updating a display to show the relocated game in its new bracket round. This may be seen, for example in FIGS. 5A and 5B.

At block 925, the SLA system 100 checks to see if the user is still configuring the tournament brackets. For example, the user interface may provide a user-selectable element, such as a button or link, which the user may select to save the tournament bracket or otherwise end a configuration session. In another embodiment, the SLA system 100 may determine the user has finished configuring the tournament brackets in response to the user navigating away from the tournament bracket management user interface or similar action such as logging out of the SLA system 100 or otherwise ending a user session. If the user is still configuring the tournament brackets, the process may return to block 915 and receive additional user interaction input data indicating further requests to update the tournament bracket by adding, removing or moving games. Thus, the process for blocks 915, 920 and 925 may continue to repeat an indeterminate or iterative number of times as the user continues to build the tournament bracket. Once the user is finished configuring the tournament brackets, the process can proceed to block 930.

At block 930, the SLA system 100 constructs or updates the bracket game configuration based on the tournament bracket user interface configuration. Thus, for example, if the user has built a tournament bracket consisting of three rounds and eight games, then the bracket game configuration will be constructed to match the user interface settings as constructed by the user. This would include which winner of each game plays the next winner of the next game, which teams or placements play in the first round of games and against who, as well as configuration data for the field and/or venue, the date and time and other such information as needed to set up each game in the tournament bracket.

At block 935, the SLA system 100 generates the tournament bracket for the selected league division based on the constructed bracket configuration. This tournament bracket may be stored in, for example, the game and schedule data store 150 for later use and access in either generating a user interface view of the tournament bracket for an end user who wishes to view the tournament schedule or for later use by the league administrator to continue editing or working on the tournament bracket. In some embodiments, the generated tournament brackets may also be saved by the administrator or user for later use as a template. Thus, a tournament bracket template library may be built up or accumulated over time which may include a library of commonly used tournament brackets or tournament configurations. These may be quickly accessed by the administrator for re-use in another tournament bracket, in a different division, and so on. Such saved templates or libraries may be stored, for example, in the league data store 140 and/or the game/schedule data store 150.

Figure 10:
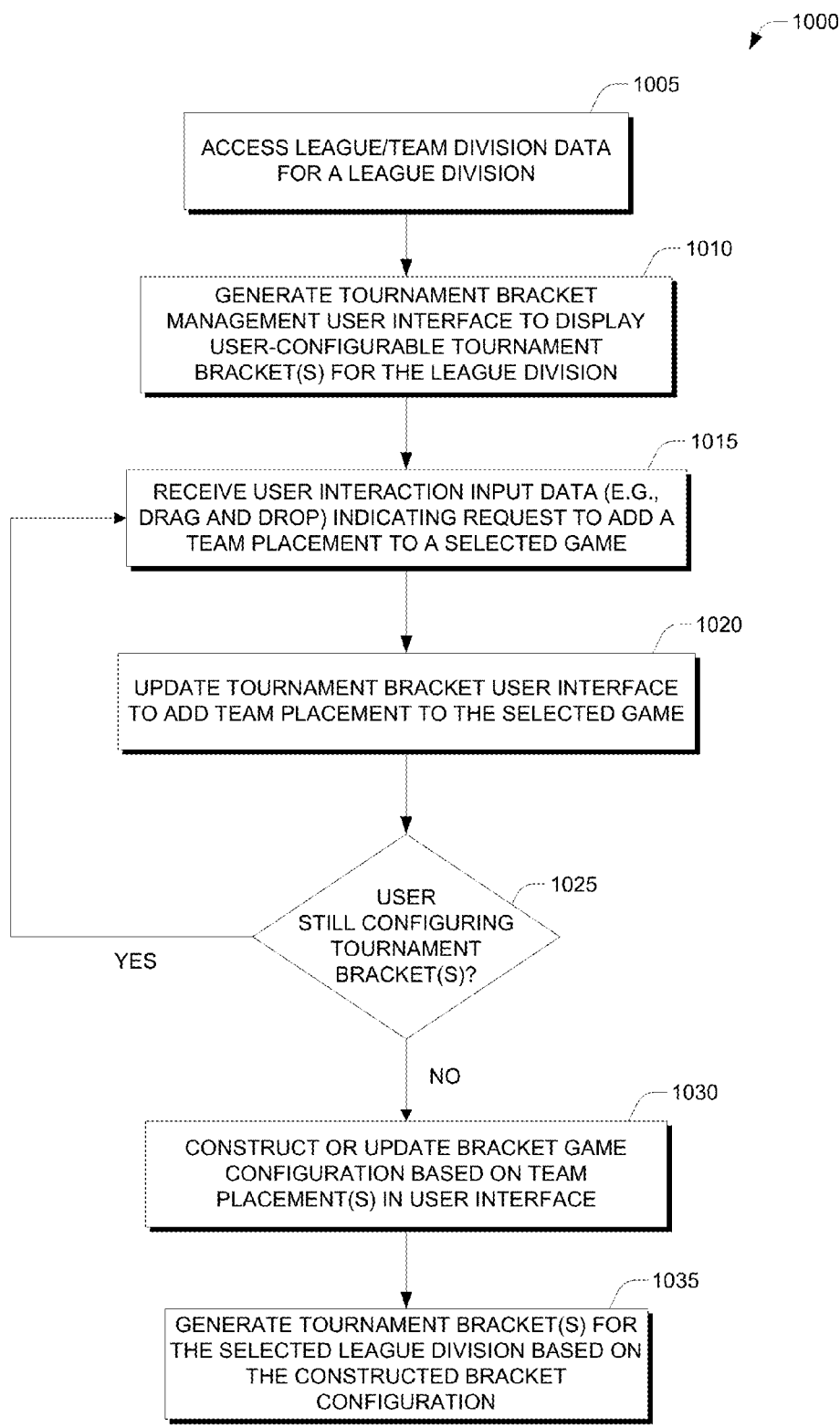
FIG. 10 is a logical flow diagram of an embodiment of a process for configuring one or more tournament brackets and generating a tournament schedule using the sport league administration system of FIG. 1.

FIG. 10 schematically illustrates a logical flow diagram of an embodiment of a process 1000 for configuring one or more tournament brackets and generating a tournament schedule in SLA system 100 of FIG. 1. The process 1000 may be executed, for example, by the league management module 110, the user interface module 130, the schedule management module 120, and/or the tournament/bracket management module 125 of the SLA system 100 of FIG. 1. In one embodiment, the process 1000 may also be executed in whole or in part by the user interface module 107 on a user computing device 105, in communication with the SLA system 100. In various embodiments, fewer blocks or additional blocks may be included in the process, or various blocks may be performed in an order different from that shown in FIG. 10. For ease of illustration, the process 1000 will be described as being executed by the SLA system 100.

Beginning at block 1005, the SLA system 100 accesses the league/team division data and game schedule data for a league division. For example, the league/team division data may be accessed from league data source 140 and the game schedule data may be accessed from the game schedule data store 150. The data may be used as part of the tournament bracket generation process, for example, by presenting a list of teams and/or a list of leagues in a user interface for selection to create a tournament bracket. Similarly, the game schedule data may be used to determine, in part, tournament bracket scheduling such as dates and times of the tournament bracket games as well as the fields and/or venues that will be used for the various games in a tournament bracket.

At block 1010, the SLA system 100 can generate the tournament bracket management user interface to display user configurable tournament brackets for the league division. An example of this user interface is shown, for example, in FIG. 2. The user interface may present various options for the user to configure the tournament bracket including, but not limited to, adding one or more brackets to a tournament, adding one or more games to a tournament bracket, branching games off of base games in the tournament bracket, and so forth, as discussed herein.

At block 1015, the SLA system 100 receives user interaction input data, such as a drag and drop operation, indicative of a request to add a team placement to a select game. For example, the process is similar to the one shown in FIG. 6A, 6B. Thus, the user may drag and drop a division placement, a flight placement, a bracket placement, a specific team or a placement by overall score into the games in the tournament bracket.

At block 1020, the SLA system 100 updates the tournament bracket user interface to add the team placement to the selected game. For example, the selected game would be updated to show the placement or team added to the game, either on the top or the bottom of the game.

At block 1025, the SLA system 100 detects or determines whether the user is still configuring the tournament brackets (e.g., similar to the description of block 925 of FIG. 9), and if so, the process may return to block 1015 to receive additional user interaction input as described above. Thus, the process may repeat blocks 1015, 1020 and 1025 an indeterminate number of times as the user continues to build the team placements for the tournament bracket.

Once the user has completed or has finished configuring a tournament bracket, then at block 1030 the SLA system 100 can construct or update the bracket game configuration based on the team placements in the user interface. The process at block 1030 is similar to the one described with reference block 930 of FIG. 9.

At block 1035, the SLA system 100 generates the tournament bracket for the selected league division based on the constructed bracket hierarchy. The process at block 1035 is similar to the one described with reference block 935 of FIG. 9.

Additional Embodiments

In general, any of the routines, processes, methods or criteria disclosed herein for dynamic generation of tournament brackets can be used individually or in combination with any of the other routines, processes, methods or criteria disclosed herein.

In some embodiments, the SLA system 100 may be configured differently, include different components or modules, and/or omit some components or modules shown in FIG. 1. For example, in one embodiment, SLA system 100 includes one or more hardware processors in communication with a computer readable medium storing software modules including instructions that are executable by the one or more hardware processors, and one or more software modules. The one or more hardware processors may include, for example, digital logic circuitry. The one or more software modules may instruct a computing system to execute the various methods, approaches, and/or techniques as described herein.

As described above, the SLA system 100 can be implemented by a computing system that includes one or more physical servers or other computing machines, such as several computing machines interconnected via a network. Thus, each of the components depicted in the SLA system 100 can include hardware and/or software for performing various features. In one embodiment, the SLA system 100 is implemented in association with a web site or collection of web sites. Various disclosed features can be incorporated into a mobile device operating system, a mobile application, a sport league administration site or service, a social networking service, or any combination of these.

The SLA system 100 can include one or more servers for receiving and responding to network requests from the user computing device(s) 105. The one or more servers can include web servers, application servers, database servers, combinations of the same, or the like. In some embodiments, the network 160 is a publicly accessible network of linked networks, possibly operated by various distinct parties, such as the Internet. In other embodiments, the network 160 may be a private network, such as, for example, a corporate or university network that is wholly or partially inaccessible to non-privileged users. In still other embodiments, the network 160 may include one or more private networks with access to and/or from the Internet. User computing devices 105 may be any type of personal computer or mobile computing device (such as a smart phone, tablet, electronic book reader, or any other type of portable computing device).

The processing of the various components of the SLA system 100 can be distributed across multiple machines, networks, and other computing resources. The various components of the SLA system 100 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

In some embodiments, the SLA system 100 may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

In some embodiments, the SLA system 100 may be implemented on, or in communication with, one or more hosted computing environments. The hosted computing environments may include a collection of rapidly provisioned and released computing resources hosted in connection with the SLA system 100. Such computing resources may be referred to, individually, as host computing devices. The computing resources may further include a number of computing, networking and storage devices in communication with one another. In some embodiments, the computing devices may correspond to physical computing devices. In other embodiments, the computing devices may correspond to virtual machine instances implemented by one or more physical computing devices. In still other embodiments, computing devices may correspond to both virtual computing devices and physical computing devices. A hosted computing environment may also be referred to as a cloud computing environment.

Each of the processes, methods, and algorithms described in the preceding sections may be embodied in, and fully or partially automated by, code modules executed by one or more computers, computer processors, or machines configured to execute computer instructions. The code modules may be stored on any type of non-transitory computer-readable medium or tangible computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

CONCLUSION

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A non-transitory computer readable medium that stores executable program code that directs a computing system to provide an interactive user interface having functionality for interactively editing a tournament bracket, wherein the user interface:
   displays a hierarchical tree representation of the bracket, wherein the hierarchical tree representation includes a visual representation of each game of the bracket, each visual representation of a game positioned to indicate a round to which the game is assigned;
   displays, within the hierarchical tree representation of the bracket, for games that are not fully dependent upon outcomes of other games in the bracket, game addition elements that are selectable to add new games to the bracket;
   responds to user selection of a game addition element corresponding to a selected game by adding the new game to the bracket, in a round preceding a round of the selected game, such that a winner of the new game plays in the selected game;

displays multiple listings of team designators, including at least (1) a listing of teams, and (2) a listing of placements; and provides a drag-and-drop interface than enables a user to select a team designator from one of the multiple listings of team designators, and to drag and drop the selected team designator to a visual representation of a target game in the hierarchical tree representation to thereby assign the team designator to the target game, whereby the user can assign to the game a team or a placement, wherein the user interface is configured to update respective visual representations of games to display teams determined to correspond with assigned placements.

2. The computer readable medium of claim 1, wherein the user interface also provides a game drag-and-drop interface that enables the user to modify the round to which a particular game is assigned by dragging and dropping the visual representation of the particular game to a new position in the hierarchical tree representation.

3. The computer readable medium of claim 1, wherein the user interface:

responds to user interaction with a zoom control that enables a user to interactively zoom in and out on the hierarchical tree representation; and updates the hierarchical tree representation based on the user interaction with the zoom control.

4. The computer readable medium of claim 1, wherein the user interface, by enabling a user to drag and drop a placement to the visual representation of a target game, enables the user to define games in terms of placements that have not yet been determined.

5. A computer-implemented method comprising:

providing, for presentation on a computer device, a user interface describing a first tournament bracket that includes a plurality of games organized into rounds, the user interface comprising:

a representation of a bracket hierarchy of the first tournament bracket, the representation including a representation of a first game of the plurality of games, a list of placements available for inclusion in games included in the first tournament bracket, each listed placement being indicative of a particular team at a time prior to a start of a game in which the placement is included, and a list of teams available for inclusion in games included in the first tournament bracket, each listed team being presently indicative of a particular team;

receiving user input indicating a selection of a first team or a first placement and an assignment of the selection to the first game; and updating the representation of the first game to include information describing the first team or the first placement, wherein for a selection of the first placement, information describing the first placement is updated to indicate a team determined to correspond to the first placement.

6. The computer-implemented method of claim 5, wherein the first placement is indicative of a team associated with winning or losing a game that was played, or is to be played, prior to the first game, or is indicative of a team associated with a particular position in a ranking of the teams, and wherein the first team indicates a name associated with the first team.

7. The computer-implemented method of claim 6, wherein the ranking of the teams comprises a ranking of the teams at an end of a prior tournament bracket, or a ranking of the teams at a time the first tournament bracket is scheduled to begin.

8. The computer-implemented method of claim 6, wherein each game that was played, or is to be played, prior to the first game is included in the user interface as a respective representation of a game of the plurality of games.

9. The computer-implemented method of claim 8, further comprising:

receiving user input specifying a request to add a new game to the first tournament bracket;

updating the user interface to include a representation of the new game; and updating the list of placements to include a placement associated with a team that wins or loses the new game.

10. The computer-implemented method of claim 6, wherein information describing the first placement comprises text that describes the indication of the first placement.

11. The computer-implemented method of claim 5, wherein the user-input indicates selection of a first placement that is indicative of a team winning or losing a succession of games prior to a start of the first game, the method further comprising:

monitoring information indicating the respective associated team that won or lost each game in the succession of games; and dynamically updating the representation of the first game to include a name associated with the team that won or lost the succession of games.

12. The computer-implemented method of claim 5, wherein the user interface further describes a second tournament bracket that includes games to be played substantially concurrently with the games included in the first tournament bracket, the user interface comprising:

a representation of a bracket hierarchy of the second tournament bracket, the representation of the bracket hierarchy including a representation of a second game associated with a round in the bracket hierarchy, and wherein the method further comprises:

receiving user input specifying a second placement to be included in the second game, wherein the second placement is indicative of a team associated with winning or losing a game that was played, or is to be played, in the first tournament bracket prior to the second game, and updating the representation of the second game to include information describing the second placement.

13. A non-transitory computer readable medium that stores executable program code that directs a computing device to perform operations comprising:

providing, for presentation on the computer device, a user interface describing a first tournament bracket that includes a plurality of games organized into rounds, the user interface comprising:

a representation of a bracket hierarchy of the first tournament bracket, the representation including a representation of a first game of the plurality of games that is associated with a round in the bracket hierarchy, a list of placements available for inclusion in games included in the first tournament bracket, each listed placement being indicative of a particular team at a time prior to a start of a game in which the placement is included, and a list of teams available for inclusion in games included in the first tournament bracket, each listed team being presently indicative of a particular team;

receiving user input indicating a selection of a first team or a first placement and an assignment of the selection to the first game; and updating the representation of the first game to include information describing the first team or the first placement, wherein for a selection of the first placement, information describing the first placement is updated to indicate a team determined to correspond to the first placement.

14. The non-transitory computer readable medium of claim 13, wherein the first placement is indicative of a team associated with winning or losing a game that was played, or is to be played, prior to the first game, or is indicative of a team associated with a particular position in a ranking of the teams, and wherein the first team indicates a name associated with the first team.

15. The non-transitory computer readable medium of claim 14, wherein the ranking of the teams comprises a ranking of the teams at an end of a prior tournament bracket, or a ranking of the teams at a time the first tournament bracket is scheduled to begin.

16. The non-transitory computer readable medium of claim 14, wherein each game that was played, or is to be played, prior to the first game is included in the user interface as a respective representation of a game of the plurality of games.

17. The non-transitory computer readable medium of claim 16, further comprising:

receiving user input specifying a request to add a new game to the first tournament bracket;

updating the user interface to include a representation of the new game; and updating the list of placements to include a placement associated with a team that wins or loses the new game.

18. The non-transitory computer readable medium of claim 14, wherein information describing the first placement comprises text that describes the indication of the first placement.

19. The non-transitory computer readable medium of claim 13, wherein the user interface further describes a second tournament bracket that includes games to be played substantially concurrently with the games included in the first tournament bracket, the user interface comprising:

a representation of a bracket hierarchy of the second tournament bracket, the representation of the bracket hierarchy including a representation of a second game associated with a round in the bracket hierarchy, and wherein the operations further comprise:

receiving user input specifying a second placement to be included in the second game, wherein the second placement is indicative of a team associated with winning or losing a game that was played, or is to be played, in the first tournament bracket prior to the second game, and updating the representation of the second game to include information describing the second placement.

20. The non-transitory computer-readable medium of claim 13, wherein the user-input indicates selection of a first placement that is indicative of a team winning or losing a particular game prior to a start of the first game, and wherein the operations further comprise:

obtaining information indicating the associated team that won or lost the particular game; and updating the representation of the first game to include a name associated with the team that won or lost the particular game.

* * * * *

UNITED STATES PATENT AND TRADEMARK OFFICE
CERTIFICATE OF CORRECTION

PATENT NO.       : 9,772,758 B2
APPLICATION NO.  : 14/939882
DATED            : September 26, 2017
INVENTOR(S)      : Jeffrey Lowell Lawson It is certified that error appears in the above-identified patent and that said Letters Patent is hereby corrected as shown below:

In Column 9 at Line 37, replace "game 6" with --Game 006--.

In Column 17 at Line 6, replace "than" with --that--.

Signed and Sealed this
Tenth Day of April, 2018

Andrei Iancu
*Director of the United States Patent and Trademark Office*